United States Patent [19]
Walker et al.

[11] Patent Number: 5,812,569
[45] Date of Patent: Sep. 22, 1998

[54] STABILIZATION OF THE OUTPUT ENERGY OF A PULSED SOLID STATE LASER

[75] Inventors: David R. Walker, Ottawa; Philip D. Barton; Robert G. Parker, both of Nepean, all of Canada

[73] Assignee: Lumonics, Inc., Kanata, Canada

[21] Appl. No.: 821,546

[22] Filed: Mar. 21, 1997

[51] Int. Cl.$^6$ .................................................. H01S 3/13
[52] U.S. Cl. ............................ 372/30; 372/10; 372/25
[58] Field of Search ............................. 372/25, 30, 10, 372/38

[56] References Cited

U.S. PATENT DOCUMENTS 3,747,019 7/1973 Koechner et al. ..................... 372/30
5,226,051 7/1993 Chan et al. ............................ 372/30

*Primary Examiner*—James W. Davie

[57] ABSTRACT

The energy of a series of output pulses of a solid state laser pumped by a diode array and triggered by a Q-switch is stabilized and rendered independent of the repetition rate by interrupting the pumping to allow the energy stored in the laser active element to fall at the commencement of an interval between a pair of Q-switch trigger signals that is longer than the interval corresponding to the chosen repetition rate. Before the second of this pair of Q-switch trigger signals occurs, the pumping is recommenced for a duration and at an input level that restore the stored energy to the value required for generating output pulses of the laser at the desired energy level.

3 Claims, 2 Drawing Sheets

STABILIZATION OF THE OUTPUT ENERGY OF A PULSED SOLID STATE LASER

FIELD OF THE INVENTION

The invention relates to the stabilization of the output energy of a pulsed solid state laser by controlling the pumping input applied to the laser by one or more laser diodes, hereinafter referred to as a diode array. More specifically, it relates to the pumping of a solid state laser that includes a Q-switch that is triggered to generate a series of short output laser pulses.

BACKGROUND OF THE INVENTION

Assuming continuous pumping at a predetermined input level by a diode array, a solid state laser stores energy in its lasing active element after each trigger signal of the Q-switch, ready to emit a further output pulse when next the Q-switch is triggered. The term "active element" is used throughout the application as a generic term for either a rod or a slab. The energy $E_s$ stored in the laser active element is given by $$E_s = E_0 \left( 1 - e^{-\frac{t_s}{T}} \right) \quad (1)$$

where $E_0$ is the maximum energy that can be stored, $t_s$ is the duration of the pumping pulse producing the energy storage, and T is the storage lifetime of the laser active element material.

At a low repetition rate f, e.g. less than 1 KHz for a Nd:YLF or YAG laser, f is significantly less than 1/T, since T is approximately 200 μsec in an Nd:YAG laser and approximately 400 μsec in an Nd:YLF laser. As a result, the stored energy $E_s$ reaches and remains at its maximum value $E_0$ between each Q-switch trigger signal. Hence, when the Q-switch is again triggered, the laser output energy is approximately equal to this maximum stored energy $E_0$, and is the same for each output pulse of the laser. This ensures stable operation of the laser in terms of its output energy.

A problem arises, however, when the repetition rate is increased to about 5 KHz or higher. Now f becomes greater than 1/T. Equation (1) can be approximated to equation (2) when $t_s/T$ is much less than one.

$$E_s \approx E_0 \left( 1 - \left( 1 - \frac{t_s}{T} \right) \right) \quad (2)$$
$$\approx \frac{E_0}{T} t_s$$

That is, $E_s$ is proportional to $t_s$, since $E_0$ and T are constants.

If under these conditions, i.e. a relatively high repetition rate, there is an increased interval between a pair of Q-switch trigger signals caused by an arbitrary off period of the laser, as is often required in commercial operations, i.e. if $t_s$ is increased, the stored energy $E_s$ while increased does not reach the level $E_0$. Then, when the next Q-switch trigger signal is applied, this increased stored energy produces a larger than normal first output pulse of the laser. This result is undesirable, and may even be catastrophic to a workpiece or to the object receiving this first high energy output pulse, or damaging to components of the laser itself such as the optics.

PRIOR ART

Reference is made to U.S. Pat. No. 5,226,051 issued Jul. 6, 1993 to M. Chan et al., the contents of which are hereby incorporated herein by reference. The relationship of the present invention to the disclosure of this Chan et al. patent is discussed below.

SUMMARY OF THE INVENTION

It is the object of the present invention to provide a method of laser pumping control that avoids an output pulse from the laser that has a higher or lower energy than the other pulses after an arbitrary off period.

This object of the invention can be achieved by a method of pumping control that maintains a substantially constant level of laser output energy regardless of whether or not there has been a time interval between a pair of Q-switch trigger signals that is longer than the normal length corresponding to the chosen repetition rate.

The objective is to render this stabilization of output energy independent of the repetition rate. The operator can then change the repetition rate at will without having to make other adjustments to the laser and without risking the generation of an output pulse of excessive energy.

To this end, the invention relates to a method of stabilizing the energy of a series of output pulses of a solid state laser that has a lasing active element, a laser diode array for pumping the active element at a predetermined input level to raise energy stored in the active element between laser output pulses to a selected value that will generate these pulses at the desired energy level, and a Q-switch for generating these output pulses by triggering release of the stored energy in the active element at repeated time intervals, each such interval being of a selected length corresponding to the chosen repetition rate.

The inventive method comprising interrupting the pumping at the commencement of an interval between a pair of Q-switch trigger signals that is longer than the selected length whereby to cause the stored energy in the active element to fall, and then recommencing the pumping before the occurrence of the second of this pair of Q-switch trigger signals for a duration and at an input level that are such as to restore the stored energy in the active element to the selected value by the time of the occurrence of the second trigger signal.

DETAILED DESCRIPTION

Figure 1:
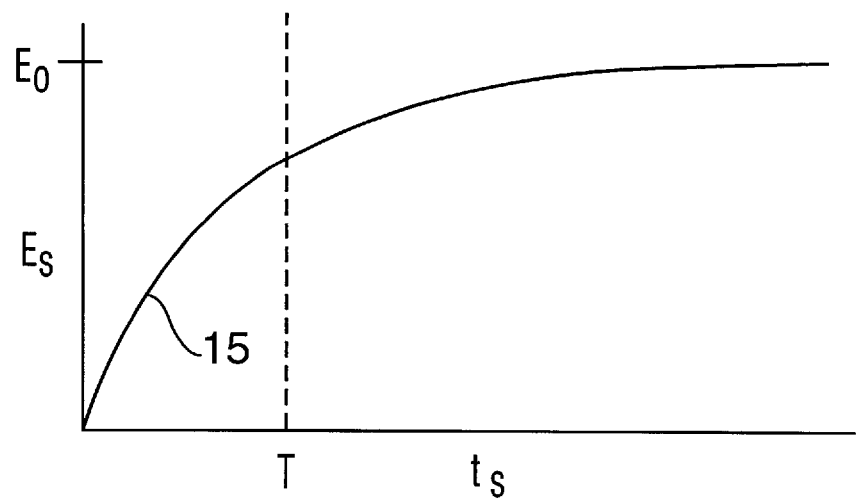
FIG. 1 is a diagram illustrating equation (1) above.

FIG. 1 shows graphically the relationship between $E_s$, $E_0$ and T for different values of $t_s$, as expressed in equation (1) or (2).

Figure 2:
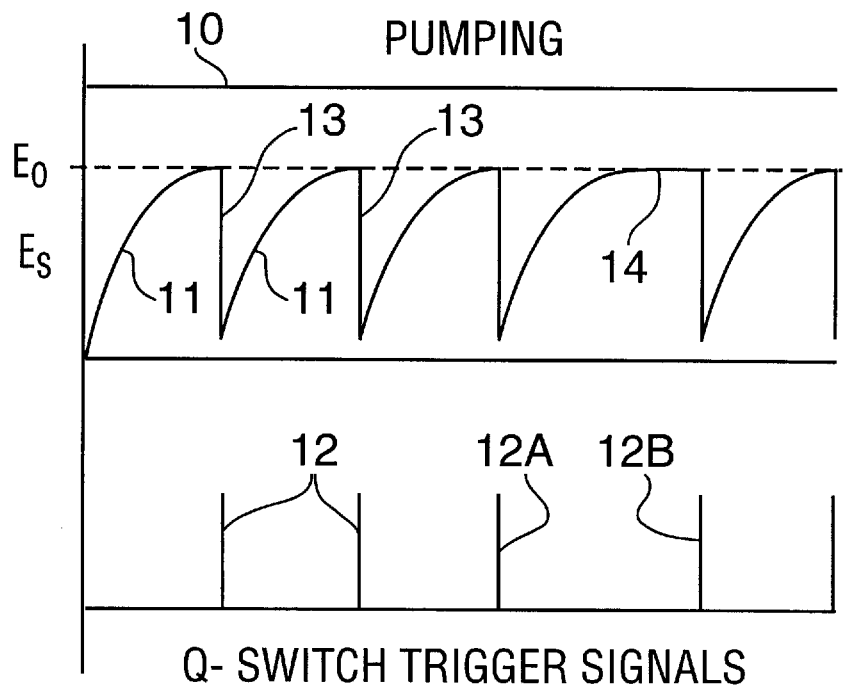
FIG. 2 is a diagram illustrating conventional pumping of a Q-switched solid state laser at a low repetition rate.

FIG. 2, which illustrates the conventional performance of the laser at a low repetition rate, say 1 KHz, when $t_s$ is significantly greater than T, shows a continuous level of input pumping 10 received from the diode array, and the stored energy $E_s$ in the active element that builds up at 11 between Q-switch trigger signals 12 to the maximum level $E_0$ and remains there until it falls at 13 when the stored energy is used to generate an output pulse of the laser. If a delay in the operation of the Q-switch occurs, as between pulses 12A and 12B, the stored energy $E_s$ remains at the level $E_0$, as shown at 14, so that the next output pulse of the laser, i.e. the output pulse caused by the Q-switch trigger 12B, remains at the same energy level as all the other output pulses.

Figure 3:
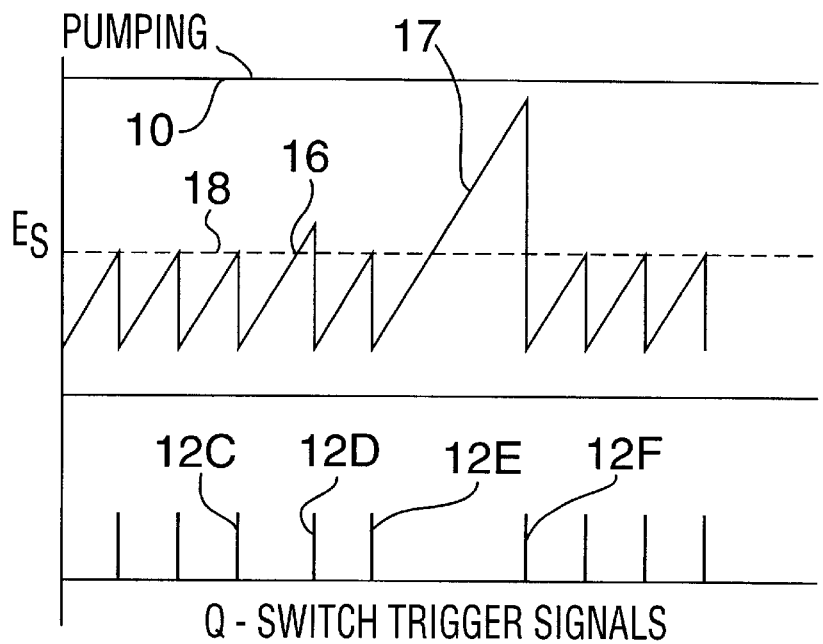
FIG. 3 is a diagram illustrating the effect of conventional pumping of a Q-switch solid state laser at a high repetition rate.

FIG. 3 shows what happens with continuous pumping 10 as before, when the repetition rate is increased to a relatively high value, say 5 KHz, i.e. when $t_s$ becomes less than T. The system now operates in the region 15 of FIG. 1, i.e. before the stored energy $E_s$ can reach its maximum value $E_0$ between Q-switch trigger signals. If there is an increased time interval between Q-switch trigger signals 12C and 12D, or 12E and 12F, the stored energy $E_s$ rises, as shown at 16 and 17, to values that exceed the normal peak value 18 attained when the Q-switch trigger signals are not temporarily interrupted. These higher energy values 16 and 17 produce higher energy laser output pulses, which, as explained above, are undesirable.

Figure 4:
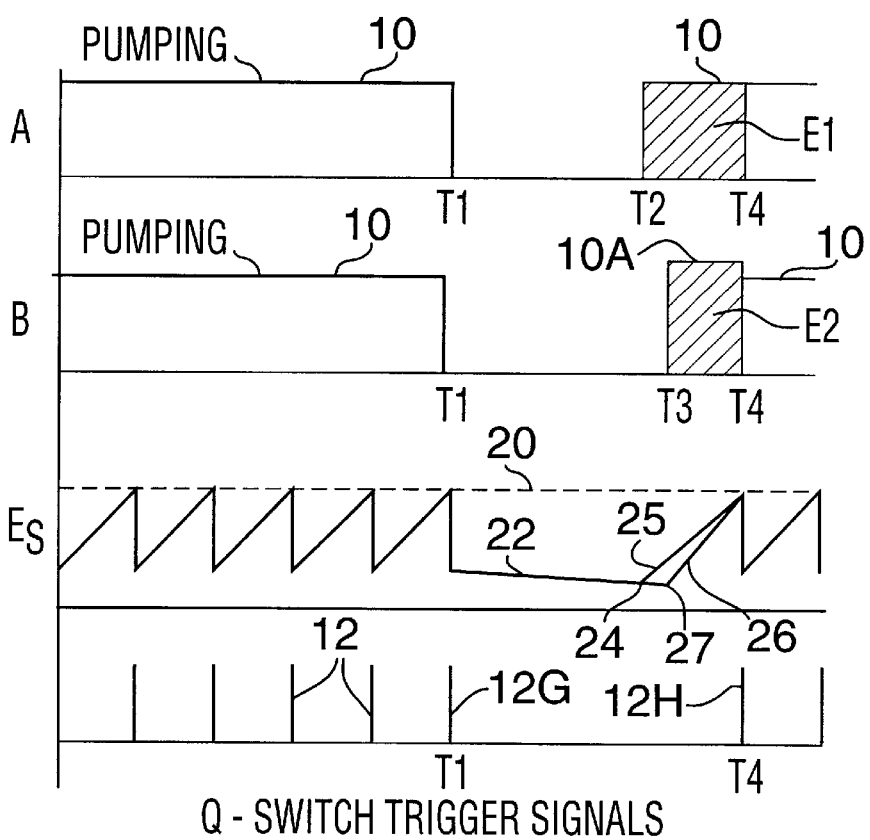
FIG. 4 is a diagram illustrating two embodiments of the present invention that serve to overcome the problem presented by operation of such a laser at a high repetition rate.

FIG. 4 illustrates two embodiments of the present invention that avoid this disadvantage in a high repetition rate situation when a longer than normal interval occurs between a pair of Q-switch signals 12G and 12H. Unlike the conventional method in which the pumping input is maintained at its predetermined continuous level 10, the pump input is reduced to zero or to a level close to or below its threshold for optical emission at time T1 immediately after the last Q-switch pulse 12G. As a result, the stored energy $E_s$ starts to fall at 22 due to natural decay.

In the case of embodiment A, the pumping is recommenced at the original input level 10 at time T2. This time T2 is chosen to be slightly earlier than one normal Q-switch pulse interval (as determined by the repetition rate) before the next pulse 12H, so that the area E1 of the pumping energy is sufficient to restore the stored energy $E_s$ back to the selected value 20 that will generate output pulses of the laser at the desired energy level during routinely spaced Q-switch trigger signals 12. The slightly early start of this recommencement of the pumping is required to compensate for the decay, since the energy level has to come from the decayed level 24. Line 25 shows this increase in the stored energy, and the area E1 represents the total input required to bring $E_s$ back to the selected value 20.

In the case of embodiment B, the recommencement of pumping takes place at time T3 which is one normal Q-switch interval before the second signal 12H, and, again to compensate for the decay, is temporarily applied at a slightly high value 10A. Line 26 shows how the energy climbs back to the value 20 from the decayed level 27. The value 10A is so chosen that the area E2 represents the necessary pumping input for this result to be achieved. At time T4 when the second Q-switch trigger signal 12H is received the pumping input level reverts to its normal value 10.

This method requires the computer controlling energisation of the diode array either to follow a predetermined program, as often will be the case, or otherwise to have advance knowledge of the timing of the Q-switch trigger signals. For example, the computer needs to know that the first pulse 12G of the more lengthily spaced pair of Q-switch trigger signals will be followed by an interval that is longer than normal. Based upon this information the computer will switch off the pumping at time T1. The computer also needs to know by time T2 or T3 (depending upon which embodiment of the method is being used) that the second Q-switch trigger signal 12H will occur at time T4.

The diode array need not necessarily be entirely switched off when there is to be no pumping input at time T1, as long as the energisation of the diodes is taken below the threshold for their optical output. It may be desired to maintain low level energisation of the diodes for the purpose of temperature control of the diodes themselves.

While the Chan et al. patent referred to above is directed to a similar objective, namely maintaining substantially constant the energy of a series of output pulses from a pulsed solid state laser regardless of the repetition rate, the patentees proposed a solution to this problem that is different from that of the present invention. Specifically, the Chan et al. proposal is to pump the laser after every Q-switch trigger signal until the stored energy reaches its desired upper value, e.g. equivalent to the selected value 20 in FIG. 4 of the present application. Then, if the Q-switch is not triggered at the end of this process, the pumping energy is maintained by being reduced to a lower level that is such as to sustain the stored energy at this upper value, not allowing the stored energy either to fall or to increase further. This procedure is illustrated in FIG. 1 of the Chan et al. patent where the pumping input 11 is shown as reduced when the stored energy 12 reaches the desired value, which value remains unchanged until the next Q-switch trigger signal.

In contrast, in the method of the present invention, the optical pumping input is fully interrupted at time T1 immediately after the trigger signal 12G so that the stored energy falls as shown at 22, and the pumping input is not recommenced until shortly before the next trigger signal 12H, i.e. at time T2 or T3. The advantage of the present invention is that, should the commercial utilization of the laser output be such that the interval between trigger signals 12G and 12H is long, i.e. seconds or even minutes, in contrast to microseconds, the lifetime of the diode array is increased by the fact that it is inactive during this long interval.

We claim:

1. A method of stabilizing the energy of a series of output pulses of a solid state laser having a lasing active element, a laser diode array for pumping the active element at a continuous predetermined input level to raise energy stored in the active element between said output pulses to a selected value that will generate output pulses of the laser at a predetermined energy level, and a Q-switch for generating said output pulses by triggering release of the stored energy in the active element at repeated time intervals each of a selected length corresponding to a chosen repetition rate; said method comprising (a) interrupting said pumping at the commencement of an interval between a pair of Q-switch trigger signals that is longer than said selected length to cause the stored energy in the active element to fall; and (b) recommencing said pumping before the occurrence of the second of said pair of Q-switch trigger signals for a duration and at an input level that are such as to restore the stored energy in the active element to said selected value by the time of the occurrence of said second trigger signal.

2. A method according to claim 1, wherein the recommenced pumping takes place at said predetermined input level for a duration longer than said selected length to compensate for decay of the stored energy between said pair of Q-switch trigger signals.

3. A method according to claim 1, wherein the recommenced pumping takes place for a duration equal to said selected length at a level higher than said predetermined input level to compensate for decay of the stored energy between said pair of Q-switch trigger signals.

* * * * *